United States Patent
Hayashi et al.

(10) Patent No.: US 9,309,374 B2
(45) Date of Patent: Apr. 12, 2016

(54) PHOTOCURABLE RESIN COMPOSITION AND METHOD OF MANUFACTURING IMAGE DISPLAY DEVICE USING THE SAME

(71) Applicant: DEXERIALS CORPORATION, Tokyo (JP)

(72) Inventors: Naoki Hayashi, Kanuma (JP); Tsukasa Nakamura, Utsunomiya (JP)

(73) Assignee: DEXERIALS CORPORATION, Tokyo (JP)

(*) Notice: Subject to any disclaimer, the term of this patent is extended or adjusted under 35 U.S.C. 154(b) by 17 days.

(21) Appl. No.: 14/110,620

(22) PCT Filed: Jan. 24, 2013

(86) PCT No.: PCT/JP2013/051426
§ 371 (c)(1),
(2) Date: Oct. 8, 2013

(87) PCT Pub. No.: WO2014/091769
PCT Pub. Date: Jun. 19, 2014

(65) Prior Publication Data
US 2014/0290849 A1 Oct. 2, 2014

(30) Foreign Application Priority Data

Dec. 14, 2012 (JP) ................. 2012-273390

(51) Int. Cl.
*C08K 5/01* (2006.01)
*G02F 1/1335* (2006.01)
(Continued)

(52) U.S. Cl.
CPC .............. *C08K 5/01* (2013.01); *C08F 220/10* (2013.01); *C09J 4/00* (2013.01); *C09J 133/06* (2013.01);
(Continued)

(58) Field of Classification Search
CPC ... G02F 1/1333; G02F 1/1335; C08F 220/10; C09J 4/00; C08K 5/01; G09F 9/00
See application file for complete search history.

(56) References Cited

U.S. PATENT DOCUMENTS

| 6,162,868 A | 12/2000 | Radigon et al. |
| 2009/0186552 A1 | 7/2009 | Shinya et al. |

(Continued)

FOREIGN PATENT DOCUMENTS

| CN | 102144009 A | 8/2011 |
| EP | 2 680 252 A1 | 1/2014 |

(Continued)

OTHER PUBLICATIONS

International Search Report issued in Application No. PCT/JP2013/051426; Dated Apr. 16, 2013 (With Translation).

(Continued)

*Primary Examiner* — Daniel McNally
(74) *Attorney, Agent, or Firm* — Oliff PLC

(57) ABSTRACT

A photocurable resin composition contains an acrylate-based oligomer component as component (a), an acrylic-based monomer component as component (b), a plasticizer component as component (c), and a photopolymerization initiator component as component (d). The total amount of the component (a) and the component (b) contained in the photocurable resin composition is 25 to 80% by mass, and the amount of the plasticizer component as the component (c) contained in the photocurable resin composition is 65 to 10% by mass. The component (c) contains a solid tackifier and a liquid plasticizing component, and the mass ratio of the tackifier to the liquid plasticizing component is in the range of 60 to 30 : 30 to 10.

8 Claims, 9 Drawing Sheets

(51) Int. Cl.
  *C09J 4/00* (2006.01)
  *C08F 220/10* (2006.01)
  *C09J 133/06* (2006.01)
  *C09J 175/16* (2006.01)
  *G02F 1/1333* (2006.01)

(52) U.S. Cl.
  CPC ............ *C09J 175/16* (2013.01); *G02F 1/1335* (2013.01); *G02F 1/133308* (2013.01); *G02F 2202/023* (2013.01)

(56) References Cited

U.S. PATENT DOCUMENTS

| | | | |
|---|---|---|---|
| 2009/0305068 A1* | 12/2009 | Morishita et al. | 428/483 |
| 2010/0003425 A1* | 1/2010 | Kamata et al. | 428/1.5 |
| 2010/0097552 A1 | 4/2010 | Shinya et al. | |
| 2010/0277684 A1* | 11/2010 | Fukushima et al. | 349/158 |
| 2013/0029075 A1* | 1/2013 | Niiyama et al. | 428/41.7 |

FOREIGN PATENT DOCUMENTS

| | | |
|---|---|---|
| EP | 2 713 355 A1 | 4/2014 |
| JP | B1-5138820 | 2/2013 |
| WO | WO 2008/126860 A1 | 10/2008 |
| WO | WO 2009/011353 A1 | 1/2009 |
| WO | WO 2010/027041 A1 | 3/2010 |
| WO | 2010/111316 A2 | 9/2010 |

OTHER PUBLICATIONS

Apr. 8, 2015 extended European Search Report issued in European Application No. 13861629.7.

Jun. 25, 2015 International Preliminary Report on Patentability issued in International Application No. PCT/JP2013/051426.

Feb. 9, 2015 Office Action issued in Chinese Patent Application No. 201380000466.5.

* cited by examiner

[FIG. 8J]

PHOTOCURABLE RESIN COMPOSITION AND METHOD OF MANUFACTURING IMAGE DISPLAY DEVICE USING THE SAME

TECHNICAL FIELD

The present invention relates to a photocurable resin composition used to form a light-transmitting cured resin layer when an image display device is manufactured by bonding and stacking, through the light-transmitting cured resin layer, an image display member such as a liquid crystal display panel and a light-transmitting cover member such as a transparent protective sheet disposed on the front side of the image display member.

BACKGROUND ART

An image display device such as a liquid crystal display panel used for an information terminal such as a smart phone is manufactured by disposing a photocurable resin composition between an image display member such as a liquid crystal display panel or an organic EL panel and a light-transmitting cover member and then curing the composition by irradiation with ultraviolet rays to form a light-transmitting cured resin layer, whereby the image display member and the light-transmitting cover member are bonded to each other and stacked on one another (Patent Literature 1).

To improve the brightness and contrast of a display image, a light-shielding layer is provided in a peripheral edge portion of the surface of the light-transmitting cover member that faces the image display member. Therefore, curing of the photocurable resin composition sandwiched between the light-shielding layer and the image display member may not proceed sufficiently. In such a case, sufficient adhesive strength is not obtained, and it is feared that peeling between the light-transmitting cover member and the image display member will occur and moisture will enter the gap, causing, for example, a reduction in image quality.

Therefore, the following has been proposed (Patent Literature 2). A thermal polymerization initiator is added to a photocurable resin composition to prepare a thermosetting and photocurable resin composition, and the thermosetting and photocurable resin composition is applied to the surface of a light-transmitting cover member having a light-shielding layer formed thereon. The coated surface of the light-transmitting cover member is placed on an image display member, and the resin composition is cured by irradiation with ultraviolet rays. Then the entire product is heated to thermally cure the thermosetting and photocurable resin composition sandwiched between the light-shielding layer and the image display member.

CITATION LIST

Patent Literature

Patent Literature 1: International Publication No. 2010/027041
Patent Literature 2: International Publication No. 2008/126860

SUMMARY OF INVENTION

Technical Problem

The technique in Patent Literature 2 is expected to solve the problems concerned in Patent Literature 1. However, the photopolymerization initiator and also the thermal polymerization initiator must be used simultaneously, and a photo polymerization process and also a thermal polymerization process must be performed. Therefore, this technique has a problem in that the burden of the capital investment for the thermal polymerization process increases and a problem in that the storage stability of the thermosetting and photocurable resin composition decreases. In addition, since the light-transmitting cover member coated with the thermosetting and photocurable resin composition has not been subjected to any curing process when the light-transmitting cover member is stacked on the image display member, the resin composition is excluded from the gap between the light-shielding layer and the surface of the light-transmitting cover member. In such a case, a step between the light-shielding layer and the surface of the light-transmitting cover member is not cancelled, and it is feared that problems such as occurrence of air bubbles and delamination between the light-transmitting cover and the resin will occur.

Therefore, when the image display device is manufactured by stacking an image display member and a light-transmitting cover member disposed on the front side thereof through a cured resin layer of a photocurable resin composition, there is a demand for an image display device that can be manufactured only by a photopolymerization process without using a thermal polymerization process. In addition to this, the demand is such that the photocurable resin composition between the light-shielding layer and the image display member can be sufficiently cured without being excluded from the gap therebetween, and the step between the light-shielding layer and the surface of the light-transmitting cover member can be cancelled.

The present applicant has conducted studies on methods that meet the demand and arrived at a method that allows the light-transmitting cured resin layer between the light-shielding layer and the image display member to be sufficiently photo-cured without being excluded from the gap therebetween and allows the step between the light-shielding layer and the light-shielding layer-formed surface of the light-transmitting cover member to be cancelled. In this method, a liquid photocurable resin composition containing no thermal polymerization initiator is first applied to the surface of the light-transmitting cover member including the light-shielding layer or the surface of the image display member to a thickness larger than the thickness of the light-shielding layer. Then the applied liquid photocurable resin composition is irradiated with ultraviolet rays to cure or pre-cure the resin composition, and the image display member and the light-transmitting cover member are thereby stacked through the cured or pre-cured resin layer. Alternatively, after the image display member and the light-transmitting cover member are stacked through the pre-cured resin layer, the pre-cured resin layer is completely cured by irradiation with ultraviolet rays.

The present applicant has also arrived at another method. In this method, the liquid photocurable resin composition is first applied to the surface of the light-transmitting cover member including the light-shielding layer or the surface of the image display member to a thickness larger than the thickness of the light-shielding layer, and the applied liquid photocurable resin composition in this state is pre-cured by irradiation with ultraviolet rays. In this case, after the image display member and the light-transmitting cover member are stacked through the pre-cured resin layer, the pre-cured resin layer can be completely cured by irradiation with ultraviolet rays. The light-transmitting cured resin layer between the light-shielding layer and the image display member can thereby be sufficiently photo-cured without being excluded from the gap therebetween. In addition, the step between the light-shielding layer and the light-shielding layer-formed surface of the light-transmitting cover member can be cancelled.

However, when the image display member and the light-transmitting cover member are stacked through the cured resin layer or the pre-cured resin layer, the adhesion and shape retainability of the cured resin layer or the pre-cured resin layer are insufficient in some cases. In addition, the adhesion retainability of the light-transmitting cured resin layer obtained by subjecting the pre-cured resin layer in the stack to complete-curing by irradiation with ultraviolet rays is insufficient in some cases.

In an image display device widely used recently, a light-transmitting cover member having no light-shielding layer formed thereon and an image display member used as an image display-input panel (a so-called touch panel) in which a touch pad used as a position input device is combined with a display element such as a liquid crystal panel are stacked through a cured resin layer. Therefore, there is a demand for a liquid photocurable resin composition that can be used to stack the light-transmitting cover member and the image display member (touch panel) of such an image display device and to stack the display element and the touch pad.

It is an object of the present invention to provide a photocurable resin composition used to manufacture, using only a photopolymerization process, an image display device including an image display member and a light-transmitting cover member that are stacked through a light-transmitting cured resin layer formed from a photocurable resin composition in a liquid form (more specifically, an image display device in which the image display member and the light-transmitting cover member having a light-shielding layer formed on its peripheral edge portion are stacked through the light-transmitting cured resin layer formed from a photocurable resin composition in a liquid form such that the light-shielding layer-formed surface of the light-transmitting cover member is disposed facing the image display member), so that the photocurable resin composition can form a cured resin layer and a pre-cured resin layer with improved shape retainability and adhesion, allows the cured resin layer to have improved adhesion retainability, and also allows a light-transmitting cured resin layer obtained by photo-curing the pre-cured resin layer to have improved adhesion retainability.

Solution to Problem

To provide a photocurable resin composition that can be preferably used to manufacture an image display device using a photopolymerization process, particularly, two photopolymerization processes, i.e., pre-curing and complete-curing processes, without using a thermal polymerization process, the present inventor has paid attention not only to components to be photo-polymerized but also to components not involved in photopolymerization. Then the present inventor has found that the above object of the invention can be achieved by selecting an acrylate oligomer, an acrylate monomer, a plasticizer, and photopolymerization initiator as four specific components, specifying the amounts added of the acrylate oligomer, the acrylate monomer, and the plasticizer, using a specific solid tackifier and a specific liquid plasticizing component to form the plasticizer, and adjusting the mass ratio of the solid tackifier to the liquid plasticizing component within a specific range. Thus, the present invention has been completed.

Accordingly, the present invention provides a photocurable resin composition that can be used to manufacture an image display device including an image display member and a light-transmitting cover member that are stacked through a light-transmitting cured resin layer formed from the photocurable resin composition in a liquid form (more specifically, an image display device in which the image display member and the light-transmitting cover member having a light-shielding layer formed on a peripheral edge portion thereof are stacked through the light-transmitting cured resin layer formed from the photocurable resin composition in a liquid form such that a light-shielding layer-formed surface of the light-transmitting cover member is disposed facing the image display member), the photocurable resin composition comprising the following components (a) to (d):

<component (a)> an acrylate-based oligomer component selected from the group consisting of a polyisoprene-based (meth)acrylate oligomer, a polybutadiene-based (meth)acrylate oligomer, and a polyurethane-based (meth)acrylate oligomer;

<component (b)> an acrylic-based monomer component;

<component (c)> a plasticizer component; and

<component (d)> a photopolymerization initiator component; wherein a total amount of the component (a) and the component (b) contained in the photocurable resin composition is 25 to 80% by mass, and an amount of the component (c) contained in the photocurable resin composition is 65 to 10% by mass, and wherein the component (c) contains a solid tackifier (1) having a softening point of 60 to 150° C. and a liquid plasticizing component (2), and a mass ratio of the tackifier (1) to the liquid plasticizing component (2) is in a range of 60 to 30:30 to 10.

The present invention also provides two methods of manufacturing an image display device using the above-described photocurable resin composition. One manufacturing method is a method in which the photocurable resin composition is photo-cured to form a light-transmitting cured resin layer without forming a pre-cured resin layer. The other manufacturing method is a method in which the photocurable resin composition is first formed into a pre-cured resin layer and then the pre-cured resin layer is further photo-cured to form a light-transmitting cured resin layer.

The one manufacturing method of the present invention is a method of manufacturing an image display device including an image display member and a light-transmitting cover member that are stacked through a light-transmitting cured resin layer formed from a photocurable resin composition in a liquid form (more specifically, an image display device in which the image display member and the light-transmitting cover member having a light-shielding layer formed on a peripheral edge portion thereof are stacked through the light-transmitting cured resin layer formed from the photocurable resin composition in a liquid form such that a light-shielding layer-formed surface of the light-transmitting cover member is disposed facing the image display member), the method comprising the following steps (A) to (C):

<Step (A)> a step of applying the photocurable resin composition in a liquid form to a surface of the light-transmitting cover member or a surface of the image display member (more specifically, the step of applying the photocurable resin composition in a liquid form to the light-shielding layer-formed surface of the light-transmitting cover member or the surface of the image display member to a thickness larger than a thickness of the light-shielding layer such that a step formed between the light-shielding layer and the light-shielding layer-formed surface of the light-transmitting cover member is cancelled);

\<Step (B)\> a step of irradiating the applied photocurable resin composition with ultraviolet rays to form a cured resin layer; and \<Step (C)\> a step of laminating the light-transmitting cover member to the image display member such that the cured resin layer is disposed inward to thereby obtain the image display device (more specifically, the step of laminating the light-transmitting cover member to the image display member such that the light-shielding layer and the cured resin layer are disposed inward to thereby obtain the image display device), wherein the photocurable resin composition contains the following components (a) to (d):

\<component (a)\> an acrylate-based oligomer component selected from the group consisting of a polyisoprene-based (meth)acrylate oligomer, a polybutadiene-based (meth)acrylate oligomer, and a polyurethane-based (meth)acrylate oligomer;

\<component (b)\> an acrylic-based monomer component;
\<component (c)\> a plasticizer component; and
\<component (d)\> a photopolymerization initiator component; wherein a total amount of the component (a) and the component (b) contained in the photocurable resin composition is 25 to 80% by mass, and an amount of the component (c) contained in the photocurable resin composition is 65 to 10% by mass, and wherein the component (c) contains a solid tackifier (1) having a softening point of 60 to 150° C. and a liquid plasticizing component (2), and a mass ratio of the tackifier (1) to the liquid plasticizing component (2) is in a range of 60 to 30:30 to 10.

The other manufacturing method of the invention is a method of manufacturing an image display device including an image display member and a light-transmitting cover member that are stacked through a light-transmitting cured resin layer formed from a photocurable resin composition in a liquid form (more specifically, an image display device in which the image display member and the light-transmitting cover member having a light-shielding layer formed on a peripheral edge portion thereof are stacked through the light-transmitting cured resin layer formed from the photocurable resin composition in a liquid form such that a light-shielding layer-formed surface of the light-transmitting cover member is disposed facing the image display member), the method comprising the following steps (A) to (D):

\<Step (A)\> a step of applying the photocurable resin composition in a liquid form to a surface of the light-transmitting cover member or a surface of the image display member (more specifically, the step of applying the photocurable resin composition in a liquid form to the light-shielding layer-formed surface of the light-transmitting cover member or the surface of the image display member to a thickness larger than a thickness of the light-shielding layer such that a step formed between the light-shielding layer and the light-shielding layer-formed surface of the light-transmitting cover member is cancelled);

\<Step (B)\> a step of irradiating the applied photocurable resin composition with ultraviolet rays to pre-cure the applied photocurable resin composition, whereby a pre-cured resin layer is formed;

\<Step (C)\> a step of laminating the light-transmitting cover member to the image display member such that the pre-cured resin layer is disposed inward (more specifically, the step of laminating the light-transmitting cover member to the image display member such that the light-shielding layer and the pre-cured resin layer are disposed inward); and \<Step (D)\> a step of irradiating the pre-cured resin layer held between the image display member and the light-transmitting cover member with ultraviolet rays to completely cure the pre-cured resin layer, whereby the image display device is obtained in which the image display member and the light-transmitting cover member are stacked through the light-transmitting cured resin layer; wherein the photocurable resin composition contains the following components (a) to (d):

\<component (a)\> an acrylate-based oligomer component selected from the group consisting of a polyisoprene-based (meth)acrylate oligomer, a polybutadiene-based (meth)acrylate oligomer, and a polyurethane-based (meth)acrylate oligomer;

\<component (b)\> an acrylic-based monomer component;
\<component (c)\> a plasticizer component; and
\<component (d)\> a photopolymerization initiator component; wherein a total amount of the component (a) and the component (b) contained in the photocurable resin composition is 25 to 80% by mass, and an amount of the component (c) contained in the photocurable resin composition is 65 to 10% by mass, and wherein the component (c) contains a solid tackifier (1) having a softening point of 60 to 150° C. and a liquid plasticizing component (2), and a mass ratio of the tackifier (1) to the liquid plasticizing component (2) is in a range of 60 to 30:30 to 10.

Advantageous Effects of Invention

In the photocurable resin composition of the present invention, an acrylate-based oligomer, an acrylate-based monomer, a plasticizer, and a photopolymerization initiator are selected as four specific components, and the amounts added of the acrylate-based oligomer, the acrylate-based monomer, and the plasticizer are specified. In addition, a specific solid tackifier and a specific liquid plasticizing component are used to form the plasticizer, and the mass ratio of the solid tackifier to the liquid plasticizing component is adjusted within a specific range. Therefore, the photocurable resin composition can be preferably used to manufacture an image display device using a photopolymerization process, particularly, two photopolymerization processes, i.e., pre-curing and complete-curing processes, without using a thermal polymerization process. In addition, the shape retainability, adhesion, and adhesion retainability of the cured resin layer when lamination is performed after photo-curing can be improved, and the shape retainability, adhesion, and adhesion retainability of the pre-cured resin layer and its adhesion retainability after curing can also be improved.

BRIEF DESCRIPTION OF DRAWINGS

FIG. 1aa is an explanatory view of a step (aa) in a method of manufacturing an image display device of the present invention.

FIG. 1bb is an explanatory view of the step (aa) in the method of manufacturing the image display device of the present invention.

FIG. 1cc is an explanatory view of a step (bb) in the method of manufacturing the image display device of the present invention.

FIG. 1dd is an explanatory view of the step (bb) in the method of manufacturing the image display device of the present invention.

FIG. 1ee is an explanatory view of a step (cc) in the method of manufacturing the image display device of the invention.

FIG. 8J is an explanatory view of the method of manufacturing the image display device that uses the touch panel as the image display member, the method being described in Example 10.

DESCRIPTION OF EMBODIMENTS

Figure 1A:
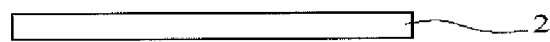
FIG. 1a is an explanatory view of a step (a) in a method of manufacturing an image display device of the present invention.

First, the photocurable resin composition of the present invention will be described, and then a method of manufacturing an image display device using the photocurable resin composition will be described.

The photocurable resin composition of the present invention can be preferably used for an image display device including an image display member and a light-transmitting cover member that are stacked through a light-transmitting cured resin layer formed from a photocurable resin composition in a liquid form (more specifically, an image display device in which the image display member and the light-transmitting cover member having a light-shielding layer formed on a peripheral edge portion thereof are stacked through a light-transmitting cured resin layer formed from a photocurable resin composition in a liquid form such that the light-shielding layer-formed surface of the light-transmitting cover member is disposed facing the image display member). The photocurable resin composition of the present invention contains the following components (a) to (d).

Note that the image display device to which the photocurable resin composition of the present invention can be preferably applied and the components constituting the device will be described in the description of a method of manufacturing the image display device of the present invention.

<Component (a)>

The photocurable resin composition of the present invention contains an acrylic-based oligomer component (component (a)) as a photo-radical polymerizable component, in order to maintain the film properties of the cured product. In the present invention, at least one selected from the group consisting of a polyisoprene-based (meth)acrylate oligomer having a polyisoprene skeleton in its main chain, a polybutadiene-based (meth)acrylate oligomer having a polybutadiene skeleton in its main chain, and a polyurethane-based (meth)acrylate oligomer having a polyurethane skeleton in its main chain is used as the acrylic-based oligomer component.

In the present invention, the term "(meth)acrylate" is a term meant to include acrylate and methacrylate.

Any polyisoprene-based (meth)acrylate oligomer having a molecular weight of preferably 1,000 to 100,000 as measured by GPC may be used, and specific preferred examples thereof include esterified products of maleic anhydride adducts of polyisoprene polymers and 2-hydroxyethyl methacrylate ((UC102 (polystyrene equivalent molecular weight: 17,000), KURARAY Co., Ltd.; UC203 (polystyrene equivalent molecular weight: 35,000), KURARAY Co., Ltd.; and UC-1 (polystyrene equivalent molecular weight: about 25,000), KURARAY Co., Ltd.).

Any polyurethane-based (meth)acrylate oligomer having a molecular weight of preferably 1,000 to 100,000 as measured by GPC may be used, and specific preferred examples thereof include aliphatic urethane acrylates (EBECRYL230 (molecular weight: 5,0000), DAICEL-CYTEC Company, Ltd. and UA-1, Light Chemical Industries Co., Ltd.).

Any polybutadiene-based (meth)acrylate-based oligomer having a molecular weight of preferably 1,000 to 100,000 as measured by GPC may be used. Furthermore, any known polybutadiene-based (meth)acrylate-based oligomer may be adopted.

<Component (b)>

The photocurable resin composition of the present invention contains a photo-radical polymerizable acrylic-based monomer component (component (b)) that functions as a reactive diluent. Specific preferred examples of the acrylic-based monomer component include 2-hydroxypropyl(meth)acrylate, benzyl acrylate, dicyclopentenyloxyethyl (meth)acrylate, isobornyl(meth)acrylate, and octyl(meth)acrylate.

If the total amount of the component (a) and the component (b) added to the photocurable resin composition is too small, the film properties of the cured product become low, and this may tend to cause a slip after bonding. If the total amount is too large, the cured product becomes too hard, and this may tend to cause deformation of parts. Therefore, to achieve the effects of the present invention, the total amount is 25 to 85% by mass and preferably 30 to 40% by mass. Regarding the mass ratio between the component (a) and the component (b), if the relative amount of the component (a) is too large, the interfacial strength of the cured product tends to become low. If the relative amount is too small, the film properties of the cured product tend to become low to be brittle. Thus, in order to achieve the effects of the present invention, the mass ratio of the component (a) to the component (b) is preferably 1:0.5 to 3 and more preferably 1:1 to 2.

<Component (c)>

The photocurable resin composition of the present invention contains a plasticizer component (component (c)) that is compatible with the acrylic-based oligomer component serving as the component (a) and can be used also as a tackifier. If the plasticizer component is not compatible with the acrylic-based oligomer component being the component (a), it is feared that the cured product will become cloudy and visibility will deteriorate. Such a plasticizer component contains a solid tackifier (1) and a liquid plasticizing component (2). The term "solid" means that the softening point according to JISK5601-2-2 is 60 to 150° C., and preferably 80 to 120° C. The term "liquid" means a state in which the viscosity by a cone plate rheometer at atmospheric pressure and 25° C. is 0.01 to 100 Pa·s (25° C.).

The solid tackifier (1) having the above softening point itself is not photo-cured by irradiation with ultraviolet rays. The solid tackifier (1) has the action of improving the initial adhesive strength (so-called tackiness) of the cured resin layer or pre-cured resin layer formed from the photocurable resin composition and the action of improving the final adhesive strength of the cured resin layer obtained by completely curing the pre-cured resin layer. Specific examples of the usable tackifier (1) include: terpene-based resins such as terpene resins, terpene phenolic resins, and hydrogenated terpene resins; rosin resins such as natural rosin, polymerized rosin, rosin esters, and hydrogenated rosins; and petroleum resins such as polybutadiene and polyisoprene. A product obtained by polymerizing the acrylic-based oligomer component serving as the component (a) or the acrylate-based monomer component serving as the component (b) so as to have a molecular weight of preferably about 1,000 to about 50,000 in advance may be added, so long as the effects of the invention are not impaired. For example, a copolymer of butyl acrylate, 2-hexyl acrylate, and acrylic acid, a copolymer of cyclohexyl acrylate and methacrylic acid, etc. may be added.

The liquid plasticizing component (2) itself is not photo-cured by irradiation with ultraviolet rays. The liquid plasticizing component (2) imparts flexibility to the cured resin layer or the pre-cured resin layer after photo-curing and reduces the cure shrinkage of the cured resin layers or of the pre-cured resin layer. Examples of such a liquid plasticizing component (2) include at least one selected from the group consisting of liquid polybutadiene-based plasticizers, liquid polyisoprene-based plasticizers, liquid phthalate-based plasticizers, and liquid adipate-based plasticizers.

The mass ratio of the tackifier (1) to the liquid plasticizing component (2) in the plasticizer component serving as the component (c) is in the range of 60 to 30:30 to 10 and preferably 60 to 40:20 to 10. In the present invention, when the amount of the solid tackifier (1) is larger than the amount of the liquid plasticizing component (2) and, particularly, falls within the above specific range, the shape retainability and adhesive strength retainability of the cured resin layer after photo-curing can be improved.

Generally, to reduce the cure shrinkage of a curable resin composition, a large amount of a liquid plasticizing component is added. However, in the manufacturing method of the present invention, the curable resin composition is irradiated with ultraviolet rays before lamination to an image display material. Therefore, it is advantageous that, even when the curable resin composition is photo-cured thereafter, large cure shrinkage does not occur. More specifically, in the present invention, the cure shrinkage can be reduced, with no restrictions imposed by the process. Therefore, the ratio of the liquid plasticizing component can be made smaller than that in conventional methods, so that the amount added of the solid tackifier can be increased.

Generally, the softening point of the tackifier (1) correlates with the molecular weight of the tackifier. Therefore, when a tackifier (1) having a softening point of 60 to 115° C. among tackifiers (1) having a softening point of 60 to 150° C. is used, the mass ratio of the tackifier (1) to the liquid plasticizing component (2) is set to fall within the range of preferably 60 to 40:20 to 10 and more preferably 60 to 50:20 to 10. When a tackifier having a softening point of 115° C. to 150° C. is used, the mass ratio of the tackifier (1) to the liquid plasticizing component (2) is set to fall within the range of preferably 50 to 30:30 to 20 and more preferably 50 to 40:30 to 20.

If the amount of the plasticizer component, i.e., the component (c), contained in the photocurable resin composition is too small, the adhesion becomes low, so that a problem such as peeling tends to occur. If the amount is too large, the heat resistance of the cured product becomes low, and it is feared that a problem such as melting in a thermal environment will occur. Therefore, to achieve the effects of the present invention, the amount of the component (c) is preferably 65 to 10% by mass, and more preferably 60 to 30% by mass.

<Component (d)>

The photocurable resin composition of the present invention contains a photopolymerization initiator component (component (d)), in order to photo-radical polymerize the photo-polymerizable components serving as the components (a) and (b).

Any known photo-radical polymerization initiator may be used as the photopolymerization initiator serving as the component (d). Examples of such an initiator include 1-hydroxycyclohexylphenyl ketone (IRGACURE 184, Ciba Specialty Chemicals), 2-hydroxy-1-{4-[4-(2-hydroxy-2-methyl-propionyl)benzyl]-phenyl}-2-methyl-propan-1-one (IRGACURE 127, Ciba Specialty Chemicals), benzophenone, and acetophenone.

If the amount of the photopolymerization initiator serving as the component (d) added to the photocurable resin composition is too small, curing by irradiation with ultraviolet rays tends to be insufficient. If the amount is too large, the amount of outgassing due to cleavage tends to increase, and this causes a foaming problem. Therefore, the amount of the photopolymerization initiator is preferably 0.1 to 5 parts by mass, and more preferably 0.2 to 3 parts by mass based on 100 parts by mass of the total amount of the acrylate-based oligomer serving as the component (a) and the acrylic-based monomer component serving as the component (b).

In addition to the above-described components (a) to (d), various additives may be added to the photocurable resin composition of the present invention so long as the effects of the present invention are not impaired. For example, to control the molecular weight of the cured resin, a chain transfer agent such as 2-mercaptoethanol, lauryl mercaptan, glycidyl mercaptan, mercaptoacetic acid, thioglycolic acid 2-ethylhexyl ester, 2,3-dimethylcapto-1-propanol, or an α-methylstyrene dimer may be added. Other commonly used additives such as an adhesion improver such as a silane coupling agent and an antioxidant may be added, if necessary.

The photocurable resin composition of the present invention can be prepared by uniformly mixing the above-described components (a) to (d) and various optional additives by any known mixing method.

A method of manufacturing the image display device of the present invention comprising steps (a) to (c) will next be described step by step in detail with reference to the drawings. In the drawings, the same numerals represent the same or similar components.

<Step (a) (Application Step)>

Figure 1B:
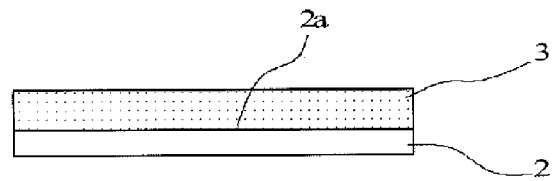
FIG. 1b is an explanatory view of the step (a) in the method of manufacturing the image display device of the present invention.

First, a light-transmitting cover member 2 is prepared as shown in FIG. 1a, and then a photocurable resin composition 3 in a liquid form is evenly applied to a surface 2a of the light-transmitting cover member 2 as shown in FIG. 1b. The application thickness in this case may be appropriately set according to the surface states of the light-transmitting cover member and the image display member, the required film properties of the cured resin layer, etc.

The application of the photocurable resin composition 3 may be performed a plurality of times to obtain the required thickness.

Any material can be used for the light-transmitting cover member 2 so long as it has light-transparency that allows an image formed in the image display member to be visible. Examples of such a material include plate-shaped materials and sheet-shaped materials formed of glass, acrylic resin, polyethylene terephthalate, polyethylene naphthalate, polycarbonate, etc. Such a material may be subjected to hard-coating treatment or antireflection treatment on one side or both sides. The physical properties such as thickness and elasticity of the light-transmitting cover member 2 may be appropriately determined according to its application purpose.

Such light-transmitting cover members 2 also include a member prepared by integrating any of the above plate-shaped materials and sheet-shaped materials with a position input device such as a touch pad through a known adhesive or the pre-cured resin layer or cured resin layer of the photocurable resin composition of the present invention.

The form of the photocurable resin composition 3 used in this step is liquid. Since the composition in a liquid form is used even when the surface shape of the light-transmitting cover member 2 or the surface shape of the image display member is distorted, the distortion can be cancelled.

Irradiation with ultraviolet rays in the step (b) described later may cause a reduction in the initial adhesive strength (so-called tackiness) of the photocurable resin composition 3 and may also cause a reduction in the final adhesive strength.

<Step (b) (Curing Step)>

Figure 1C:
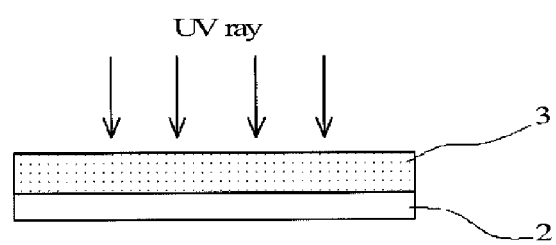
FIG. 1c is an explanatory view of a step (b) in the method of manufacturing the image display device of the present invention.
Figure 1D:
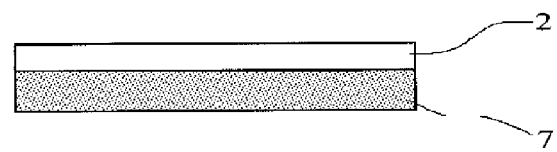
FIG. 1d is an explanatory view of the step (b) in the method of manufacturing the image display device of the present invention.

Next, the photocurable resin composition 3 applied in the step (a) is cured by irradiation with ultraviolet rays to form a light-transmitting cured resin layer 7, as shown in FIG. 1c. The reason that the photocurable resin composition 3 is cured is that its liquid form is changed to a non-flowable state so that the photocurable resin composition 3 is prevented from flowing down even when turned over as shown in FIG. 1d to thereby improve handleability. When the photocurable resin composition 3 is cured as described above, the light-transmitting cured resin layer between the light-transmitting cover member 2 and the image display member can be sufficiently photo-cured without being excluded from the gap therebetween, and the cure shrinkage can also be reduced. The level of curing is such that the degree of curing (gel fraction) of the light-transmitting cured resin layer 7 is preferably 90% or higher and more preferably 95% or higher. The degree of curing (gel fraction) is a value defined as the ratio (consumption ratio) of the amount of (meth)acryloyl groups in the photocurable resin composition 3 after irradiation with ultraviolet rays to the amount of (meth)acryloyl groups before irradiation with ultraviolet rays. The larger this value is, the higher the degree of progress of curing is.

The degree of curing (gel fraction) can be computed by substituting, in the following formula, an absorption peak height (X) from a base line at 1,640 to 1,620 mm$^{-1}$ in an FT-IR measurement chart of the resin composition layer before irradiation with ultraviolet rays and an absorption peak height (Y) from a base line at 1,640 to 1,620 mm$^{-1}$ in an FT-IR measurement chart of the resin composition layer after irradiation with ultraviolet rays.

$$\text{Degree of curing}(\%) = \{(X-Y)/X\} \times 100$$

During irradiation with ultraviolet rays, no particular limitation is imposed on the type of the light source, its output power, the cumulative light amount, etc. so long as the resin composition can be cured such that the degree of curing (gel fraction) is preferably 90% or higher. Known photo-radical polymerization process conditions for (meth)acrylate using irradiation with ultraviolet rays may be used.

<Step (c) (Lamination Step)>

Figure 1E:
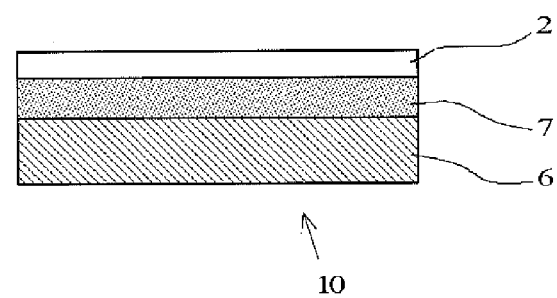
FIG. 1e is an explanatory view of a step (c) in the method of manufacturing the image display device of the present invention.
Figure 1A:
Figure 1B:
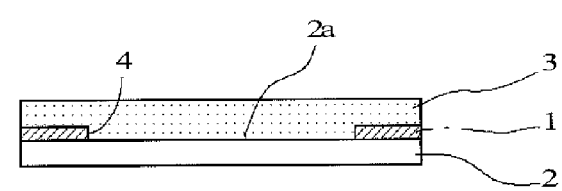
Figure 1C:
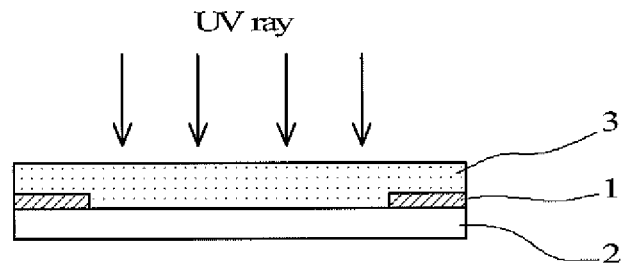
Figure 1D:
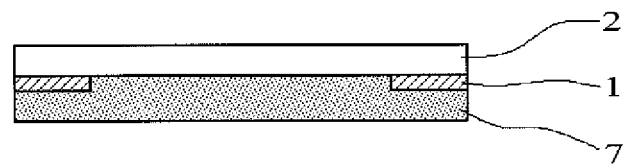
Figure 1E:
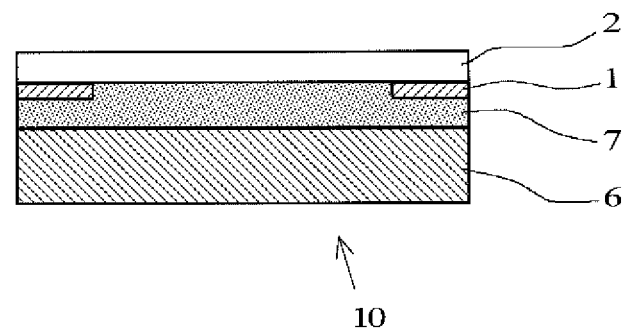
Figure 1A:
Figure 1B:
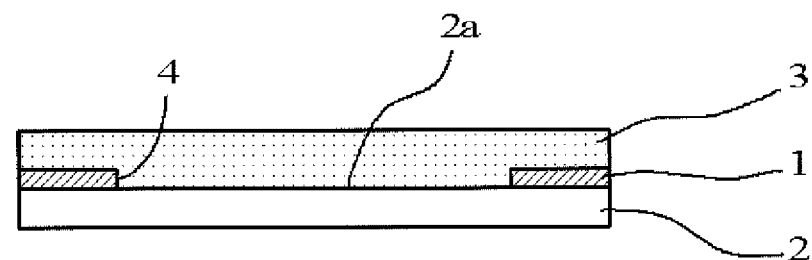
Figure 1C:
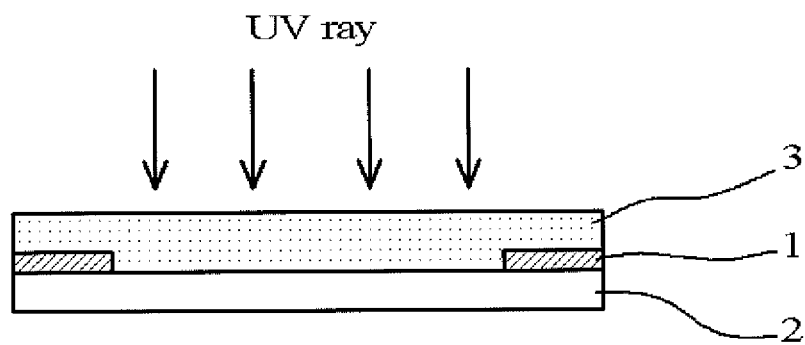
Figure 1D:
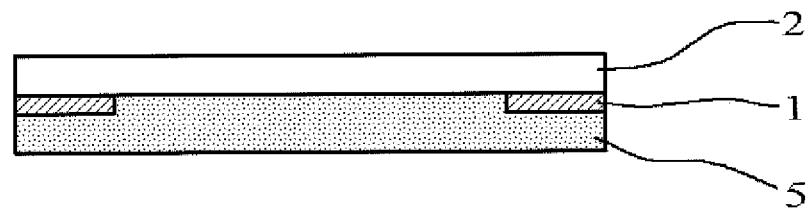
Figure 1E:
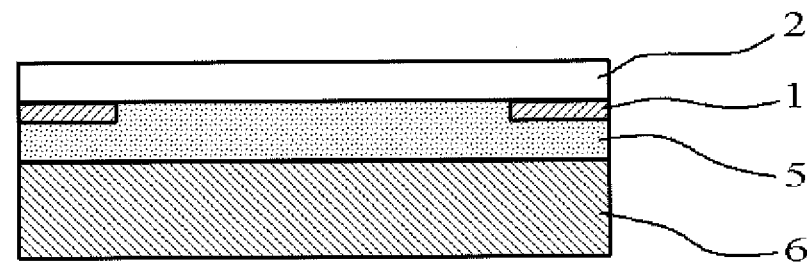

Next, the light-transmitting cover member 2 is laminated to an image display member 6 with the light-transmitting cured resin layer 7 facing the image display member 6, as shown in FIG. 1e. An image display device 10 is thereby obtained. The lamination may be performed by applying pressure at 10° C. to 80° C. using a known pressure bonding device.

Examples of the image display member 6 include liquid crystal display panels, organic EL display panels, plasma display panels, and touch panels. A touch panel is produced by integrating a display element such as a liquid crystal panel with a position input device such as a touch pad through a known adhesive or a pre-cured resin layer or cured resin layer of the photocurable resin composition of the present invention. When a touch pad has been integrated with the light-transmitting cover member 2, it is not necessary to use a touch panel as the image display member 6.

The level of the light-transparency of the light-transmitting cured resin layer 7 may be such that an image formed on the image display member 6 is visible.

In the example described in the above steps (a) to (c), the photocurable resin composition is completely cured at once. However, as described below, the photocurable resin composition may be first pre-cured. Then lamination is performed, and complete-curing is performed.

First, a light-transmitting cover member is prepared, and then the photocurable resin composition in a liquid form is evenly applied to a surface of the light-transmitting cover member. Next, the applied photocurable resin composition is cured by irradiation with ultraviolet rays to form a pre-cured resin layer with a degree of curing of 10 to 80%. Then the light-transmitting cover member 2 is laminated to the image display member with the pre-cured resin layer facing the image display member. Next, the pre-cured resin layer is irradiated with ultraviolet rays to form a light-transmitting cured resin layer with a degree of curing of preferably 90% or higher. The image display device shown in FIG. 1e is thereby obtained.

Next, a description will be given of a method of manufacturing an image display device when a light-transmitting cover member having a light-shielding layer formed on its peripheral edge is used. This production method includes the following steps (aa) to (cc).

<Step (aa) (Application Step)>

First, a light-transmitting cover member 2 having a light-shielding layer 1 formed on its peripheral edge portion on one side as shown in FIG. 1aa is prepared. As shown in FIG. 1bb, the photocurable resin composition 3 in a liquid form is applied to a surface 2a of the light-transmitting cover member 2 to a thickness larger than the thickness of the light-shielding layer 1 such that a step 4 formed between the light-shielding layer 1 and a light-shielding layer-formed surface 2a of the light-transmitting cover member 2 is cancelled. More specifically, the photocurable resin composition 3 is evenly applied to the entire surface of the light-shielding layer-formed surface 2a of the light-transmitting cover member 2 including the surface of the light-shielding layer 1 such that no step is formed. Therefore, the photocurable resin composition 3 is applied to a thickness of preferably 2.5 to 40 times, more preferably 2.5 to 12.5 times, and still more preferably 2.5 to 4 times the thickness of the light-shielding layer 1.

The application of the photocurable resin composition 3 may be performed a plurality of times to obtain the required thickness.

<Step (bb) (Curing Step)>

Next, the photocurable resin composition 3 applied in the step (aa) is cured by irradiation with ultraviolet rays to form a light-transmitting cured resin layer 7, as shown in FIG. 1cc. The reason that the photocurable resin composition 3 is cured is that its liquid form is changed to a non-flowable state so that the photocurable resin composition 3 is prevented from flowing down even when turned over as shown in FIG. 1dd to thereby improve handleability. When the photocurable resin composition 3 is cured as described above, the light-transmitting cured resin layer between the light-shielding layer 1 and the image display member can be sufficiently photo-cured without being excluded from the gap therebetween, and the cure shrinkage can also be reduced. The level of curing is such that the degree of curing (gel fraction) of the light-transmitting cured resin layer 7 is preferably 90% or higher and more preferably 95% or higher.

<Step (c) (Lamination Step)>

Next, the light-transmitting cover member 2 is laminated to an image display member 6 with the light-transmitting cured resin layer 7 facing the image display member 6, as shown in FIG. 1ee. An image display device 10 is thereby obtained. The lamination may be performed by applying pressure at 10° C. to 80° C. using a known pressure bonding device.

The level of the light-transparency of the light-transmitting cured resin layer 7 may be such that an image formed on the image display member 6 is visible.

In the example described in FIGs. 1aa to 1ee, the photocurable resin composition is applied to the light-shielding layer-formed surface of the light-transmitting cover member, and no pre-cured resin layer is formed. However, in an example described in FIGS. 1A to 1G below, the photocurable resin composition is applied to the light-shielding layer-formed surface of the light-transmitting cover member, and a pre-cured resin layer is first formed.

<Step (A) (Application Step)>

First, a light-transmitting cover member 2 having a light-shielding layer 1 formed on its peripheral edge portion on one side as shown in FIG. 1A is prepared. As shown in FIG. 1B, the photocurable resin composition 3 in a liquid form is applied to a surface 2a of the light-transmitting cover member 2 to a thickness larger than the thickness of the light-shielding layer 1 such that a step 4 formed between the light-shielding layer 1 and the light-shielding layer-formed surface 2a of the light-transmitting cover member 2 is cancelled. More specifically, the photocurable resin composition 3 is evenly applied to the entire surface of the light-shielding layer-formed surface 2a of the light-transmitting cover member 2 including the surface of the light-shielding layer 1 such that no step is formed. Therefore, the photocurable resin composition 3 is applied to a thickness of preferably 2.5 to 40 times, more preferably 2.5 to 12.5 times, and still more preferably 2.5 to 4 times the thickness of the light-shielding layer 1.

The application of the photocurable resin composition 3 may be performed a plurality of times to obtain the required thickness.

<Step (B) (Pre-Curing Step)>

Next, as shown in FIG. 1C, the photocurable resin composition 3 applied in step (A) is pre-cured by irradiation with ultraviolet rays to form a pre-cured resin layer 5. The reason that the photocurable resin composition 3 is pre-cured is that its liquid form is changed to a state in which the photocurable resin composition 3 is not highly flowable so that the photocurable resin composition 3 is prevented from flowing down even when turned over as shown in FIG. 1D to thereby improve handleability. When the photocurable resin composition 3 is pre-cured as described above, the light-transmitting cured resin layer between the light-shielding layer 1 and the image display member can be sufficiently photo-cured without being excluded from the gap therebetween, and the cure shrinkage can also be reduced. The level of pre-curing is such that the degree of curing (gel fraction) of the pre-cured resin layer 5 is preferably 30 to 80%, and more preferably 40 to 60%.

<Step (C) (Lamination Step)>

Next, the light-transmitting cover member 2 is laminated to an image display member 6 with the pre-cured resin layer 5 facing the image display member 6, as shown in FIG. 1E. The lamination may be performed by applying pressure at 10° C. to 80° C. using a known pressure bonding device.

<Step (D) (Complete-Curing Step)>

Figure 1F:
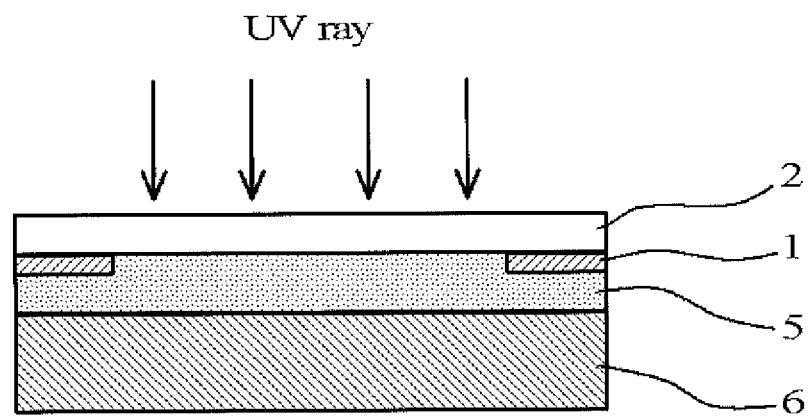
FIG. 1F is an explanatory view of a step (D) in the method of manufacturing the image display device of the present invention.
Figure 1G:
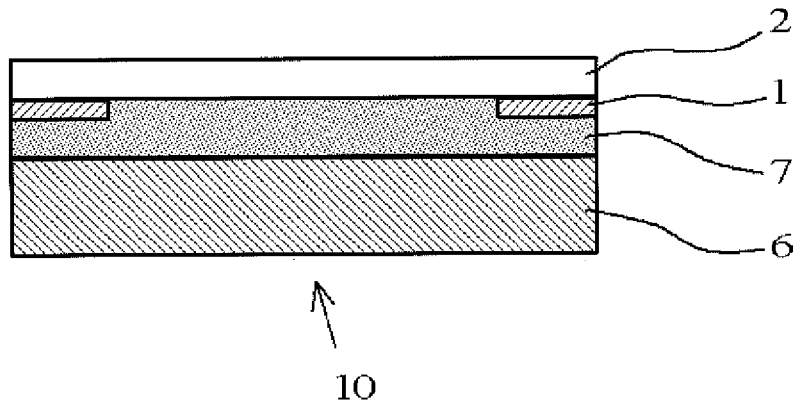
FIG. 1G is an explanatory view of the step (D) in the method of manufacturing the image display device of the present invention.

Next, the pre-cured resin layer 5 held between the image display member 6 and the light-transmitting cover member 2 is completely cured by irradiation with ultraviolet rays, as shown in FIG. 1F. If necessary, a resin layer between the light-shielding layer of the light-transmitting cover member 2 and the image display member 6 is irradiated with ultraviolet rays to completely cure the resin layer. In this manner, the image display member 6 and the light-transmitting cover member 2 are stacked through the light-transmitting cured resin layer 7, whereby an image display device 10 is obtained (FIG. 1G).

The reason that complete-curing is performed in this step is that the pre-cured resin layer 5 is sufficiently cured to thereby bond-stack the image display member 6 to-on the light-transmitting cover member 2. The level of complete-curing is such that the degree of curing (gel fraction) of the light-transmitting cured resin layer 7 is preferably 90% or higher and more preferably 95% or higher.

The level of the light-transparency of the light-transmitting cured resin layer 7 may be such that an image formed on the image display member 6 is visible.

Referring next to FIGS. 2A to 2F, a description will be given of an example in which a photocurable resin composition is applied to a surface of an image display member and a pre-cured resin layer is first formed.

<Step (AA) (Application Step)>

Figure 2A:
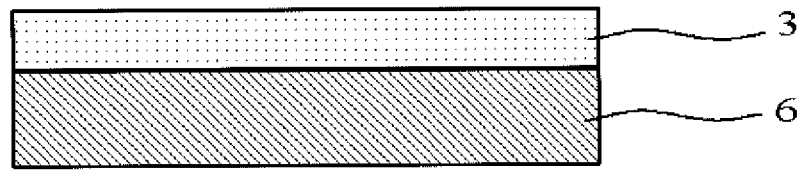
FIG. 2A is an explanatory view of a step (AA) in a method of manufacturing an image display device of the present invention.

First, as shown in FIG. 2A, the photocurable resin composition 3 is evenly applied to the surface of the image display member 6. The application thickness in this case is preferably 2.5 to 40 times, more preferably 2.5 to 12.5 times, and still more preferably 2.5 to 4 times the thickness of the light-shielding layer so that the step formed between the light-shielding layer and the light-shielding layer-formed surface of the light-transmitting cover member is cancelled.

The application of the photocurable resin composition 3 may be performed a plurality of times to obtain the required thickness.

<Step (BB) (Pre-Curing Step)>

Figure 2B:
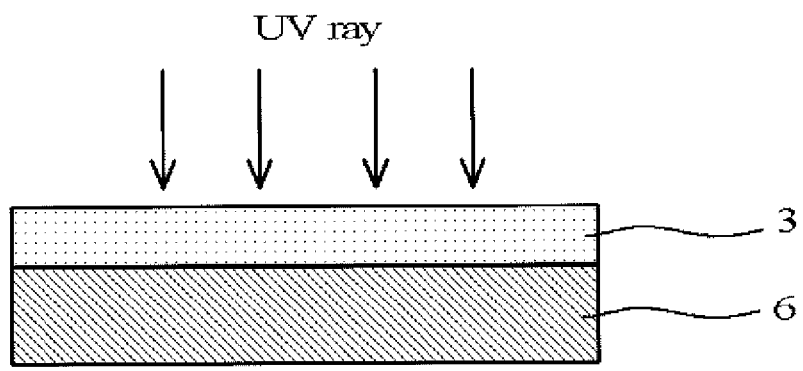
FIG. 2B is an explanatory view of a step (BB) in the method of manufacturing the image display device of the present invention.
Figure 2C:
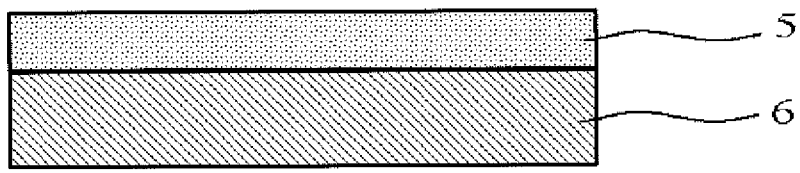
FIG. 2C is an explanatory view of the step (BB) in the method of manufacturing the image display device of the present invention.

Next, as shown in FIG. 2B, the photocurable resin composition 3 applied in the step (AA) is pre-cured by irradiation with ultraviolet rays to thereby form a pre-cured resin layer 5 (FIG. 2C). The reason that the photocurable resin composition 3 is pre-cured is that its liquid form is changed to a state in which the photocurable resin composition 3 is not highly flowable to thereby improve handleability and that, when the light-shielding layer of the light-transmitting cover member is placed on the pre-cured resin layer 5, the light-shielding layer can be pressed thereinto to the extent that the step in the light-transmitting cover member is cancelled. When the photocurable resin composition 3 is pre-cured as described above, the light-transmitting cured resin layer between the light-shielding layer and the image display member can be sufficiently photo-cured without being excluded from the gap therebetween, and the cure shrinkage can also be reduced. The level of pre-curing is such that the degree of curing (gel fraction) of the pre-cured resin layer 5 is preferably 30 to 80% and more preferably 40 to 60%.

<Step (CC) (Lamination Step)>

Figure 2D:
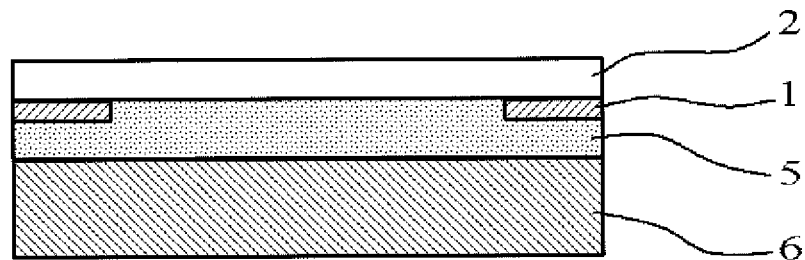
FIG. 2D is an explanatory view of a step (CC) in the method of manufacturing the image display device of the present invention.

Next, the light-transmitting cover member 2 is laminated to the pre-cured resin layer 5 on the image display member 6 with the light-shielding layer 1 facing the pre-cured resin layer 5, as shown in FIG. 2D. The lamination may be performed by applying pressure at 10° C. to 80° C. using a known pressure bonding device.

Examples of the image display member 6 include liquid crystal display panels, organic EL display panels, plasma display panels, and touch panels.

<Step (DD) (Complete-Curing Step)>

Figure 2E:
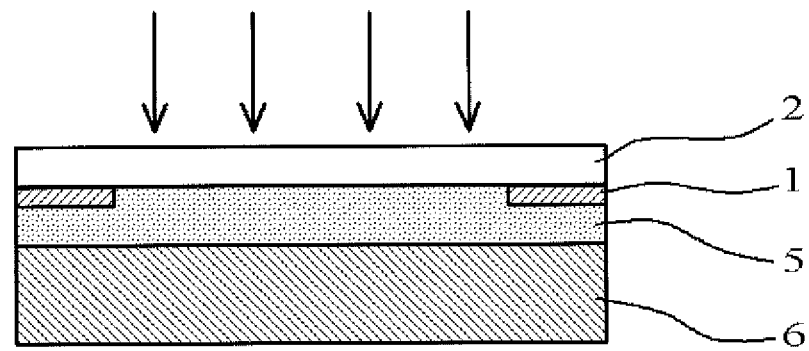
FIG. 2E is an explanatory view of a step (DD) in the method of manufacturing the image display device of the present invention.
Figure 2F:
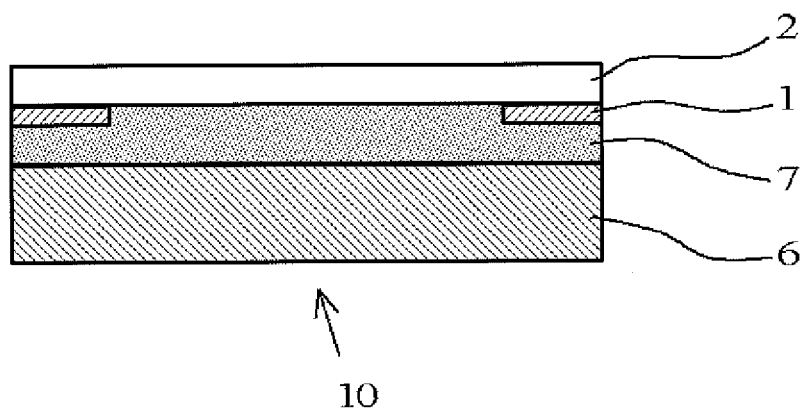
FIG. 2F is an explanatory view of the step (DD) in the method of manufacturing the image display device of the present invention.
Figure 3:
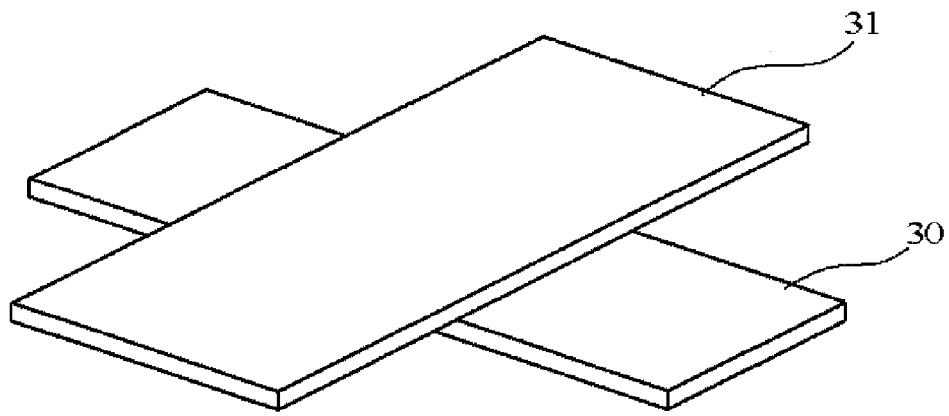
FIG. 3 is an explanatory view of an adhesive strength test for a light-transmitting cured resin layer.

Next, the pre-cured resin layer 5 held between the image display member 6 and the light-transmitting cover member 2 is completely cured by irradiation with ultraviolet rays, as shown in FIG. 2E. If necessary, a resin layer between the light-shielding layer of the light-transmitting cover member 2 and the image display member 6 is irradiated with ultraviolet rays to completely cure the resin layer. In this manner, the image display member 6 and the light-transmitting cover member 2 are stacked through the light-transmitting cured resin layer 7, whereby an image display device 10 is obtained (FIG. 2F).

The level of complete-curing in this step is such that the degree of curing (gel fraction) of the light-transmitting cured resin layer 7 is preferably 90% or higher, and more preferably 95% or higher.

The level of the light-transparency of the light-transmitting cured resin layer 7 may be such that an image formed on the image display member 6 is visible.

EXAMPLES

The present invention will next be specifically described by way of Examples.

Examples 1 to 6 and Comparative Examples 1 to 4

Step (A) (Application Step)

Glass plates with a size of 45 (w)×80 (1)×0.4 (t) mm were prepared. To form a 4 mm-wide light-shielding layer, a thermosetting-type black ink (MRX ink, Teikoku Printing Inks Mfg. Co., Ltd.) was applied to the entire peripheral edge portion of each glass plate to a dry thickness of 40 μm by screen printing and dried to prepare a light-shielding layer-formed glass plate.

An acrylic-based oligomer component, an acrylic-based monomer component, a plasticizer component (a solid tackifier and a liquid plasticizing component), and a photopolymerization initiator were uniformly mixed in amounts (parts by mass) shown in TABLE 1 to prepare a photocurable resin composition.

The photocurable resin composition was discharged onto the entire light-shielding layer-formed surface of the light-shielding layer-formed glass plate using a slit-type resin dispenser to thereby form a photocurable resin composition film of an average of 200 μm. This photocurable resin composition film was formed over substantially the entire light-shielding layer as shown in FIG. 1(B), and the thickness of the formed film was larger by about 160 μm than the thickness of the 40 μm-thick light-shielding layer.

Step (B) (Pre-Curing Step)

Next, the photocurable resin composition films were irradiated with ultraviolet rays at an intensity of 400 W/cm² using an UV irradiation apparatus (UVL-7000M4-N, USHIO Inc.) for different irradiation times such that the integrated light intensities were 1,200, 1,600, 2,000, 2,400, 2,800, 3,200, and 3,600 mJ/cm² to thereby pre-cure the photocurable resin composition films, whereby pre-cured resin layers were formed. The degree of curing corresponding to each integrated light intensity was determined on the basis of the height of an absorption peak from a base line at 1,640 to 1,620 cm$^{-1}$ in an FT-IR measurement chart. The results obtained are shown in TABLE 2.

Step (C) (Lamination Step)

Next, the glass plates obtained in the step (B) were disposed on polarizing plate-stacked surfaces of liquid crystal display elements with a size of 40 (W)×70 (L) mm with the pre-cured resin layers of the glass plates facing the polarizing plates, and pressure was applied through the glass plates using rubber rollers to laminate the glass plates to the liquid crystal display elements.

Step (D) (Complete-Curing Step)

Then each liquid crystal display element was irradiated with ultraviolet rays at 2,000 mJ/cm² using an UV irradiation apparatus (UVL-7000M4-N, USHIO Inc.) through the glass plate to completely cure the pre-cured resin layer, whereby a light-transmitting cured resin layer was formed. The degree of curing of the light-transmitting cured resin layer was at least 97%. In this manner, a liquid crystal display device in which the glass plate serving as the light-transmitting cover member was stacked on the liquid crystal display element through the light-transmitting cured resin layer was obtained.

<Evaluation>

The shape retainability, adhesion, and adhesion state of the pre-cured resin layer and the adhesion retainability of the light-transmitting cured resin layer in each of the Examples and Comparative Examples were evaluated as described below. The results obtained are shown in TABLE 2.

(Shape Retainability)

Each product (sample) obtained by performing the step (C) was visually observed to check whether or not the layer shape of the pre-cured resin layer was crushed immediately after lamination. When the shape was not crushed, the sample received a "A (good)" rating. When the shape was crushed, the sample received a "B (poor)" rating.

(Adhesion)

Each sample that had received the "A (good)" rating in the results of the evaluation of shape retainability was visually observed to check whether or not air bubbles or peeling occurred between the pre-cured resin layer and the light-shielding layer or the polarizing plate and whether or not shrinkage cavities were formed at the edges of the pre-cured resin layer. When no problem was found, the sample received a "A (good)" rating. When a problem was found, the sample received a "B (poor)" rating.

(Adhesion State)

In the process of producing the liquid crystal display device, a glass base 30 with a size of 40 (W)×70 (L) mm was used instead of the liquid crystal display element, and a glass plate 31 having a pre-cured resin layer formed thereon was applied at right angles to the glass base 30 with the pre-cured resin layer facing the glass base 30 to thereby obtain a bonded glass structure. Then the glass base 30 on the lower side was secured, and the glass plate 31 on the upper side was peeled vertically upward. The peeling behavior was visually observed, and the adhesion state was evaluated according to the following criteria. When cohesive peeling occurred, the sample received an "A (good)" rating. When interfacial peeling occurred, the sample received a "B (poor)" rating.

(Adhesion Retainability)

The image display member 6 of each liquid crystal display device that had received the "A (good)" rating in the results of evaluation of shape retainability was held and secured vertically and visually observed after left to stand at 85° C. for 24 hours to check whether or not the glass plate was displaced. When the glass plate was not displaced, the display device received an "A (good)" rating. When the glass plate was displaced, the display device received a "B (poor)" rating.

TABLE 1

| Component name | Product name | Example (parts by mass) | | | | | | Comparative Example (parts by mass) | | | |
|---|---|---|---|---|---|---|---|---|---|---|---|
| | | 1 | 2 | 3 | 4 | 5 | 6 | 1 | 2 | 3 | 4 |
| Acrylic-based oligomer component | UC-203 *1 | 30 | 40 | | | 30 | 30 | 70 | 55 | 30 | |
| | CN9004 *2 | | | 30 | | | | | | | 30 |
| | EBECRYL230 *3 | | | | 30 | | | | | | |
| Acrylic-based monomer component | FA-512M *4 | 20 | 20 | | | 20 | 20 | 30 | 40 | 20 | |
| | IBXA *5 | | | 20 | 20 | | | | | | 20 |
| | THFMA *6 | | 15 | | | | | | | | |
| | LMA *7 | 10 | 10 | | | 10 | 10 | | | 10 | |
| | LA *8 | | | | 10 | | | | | | 10 |
| | HPMA *9 | | 3 | | | | | 10 | 10 | | |
| | 4HBA* *10 | | | | 3 | 3 | | | | | 3 |
| Solid tackifier | P85 *11 | 50 | 45 | | | | | 30 | 60 | | |
| | HP-100 *12 | | | 50 | | | | | | | |
| | M105 *13 | | | | 50 | | | | | | |
| | P125 *14 | | | | | 50 | | | | | |
| | P-140 *15 | | | | | | 40 | | | | |

TABLE 1-continued

|  |  | Example (parts by mass) | | | | | | Comparative Example (parts by mass) | | | |
|---|---|---|---|---|---|---|---|---|---|---|---|
| Component name | Product name | 1 | 2 | 3 | 4 | 5 | 6 | 1 | 2 | 3 | 4 |
| Liquid tackifier | Dimerone *16 |  |  |  |  |  |  |  |  |  | 50 |
|  | Nikanol G *17 |  |  |  |  |  |  |  |  | 50 |  |
| Liquid oil component | Plyoil 110 *18 | 20 | 20 |  |  |  |  | 100 |  |  |  |
|  | TagMeR804 Special *19 |  |  | 20 | 20 |  |  |  |  | 20 | 20 |
|  | Hexamoll DINCH *20 |  |  |  |  | 20 | 25 |  |  |  |  |
| Photopolymerization initiator | Irgacure 184 *21 | 3 | 3 | 3 | 3 | 3 | 3 | 4 | 5 | 3 | 3 |

Notes
*1 Polyisoprene acrylate oligomer, Kuraray Co., Ltd.
*2 Polyurethane acrylate oligomer, Sartomer Japan Inc.
*3 Polyurethane acrylate oligomer, DAICEL-ALLNEX LTD.
*4 Dicyclopentenyloxyethyl methacrylate, Hitachi Chemical Co., Ltd.
*5 Isobornyl acrylate, Kyoeisha Chemical Co., Ltd.
*6 Tetrahydrofurfuryl methacrylate, Mitsubishi Rayon Co., Ltd.
*7 Lauryl methacrylate, Kyoeisha Chemical Co., Ltd.
*8 Lauryl acrylate, Kyoeisha Chemical Co., Ltd.
*9 2-Hydroxypropyl methacrylate, Nippon Kasei Chemical Co., Ltd.
*10 2-Hydroxyethyl acrylate, Nippon Kasei Chemical Co., Ltd.
*11 Hydrogenated terpene resin, Yasuhara Chemical Co., Ltd.
*12 Alkylphenol-modified xylene resin, Yasuhara Chemical Co., Ltd.
*13 Aromatic-modified hydrogenated terpene resin, Yasuhara Chemical Co., Ltd.
*14 Hydrogenated terpene resin, Yasuhara Chemical Co., Ltd.
*15 Hydrogenated petroleum resin, Idemitsu Kosan Co., Ltd.
*16 Terpene resin, Yasuhara Chemical Co., Ltd.
*17 Xylene resin, Fudow Company Limited
*18 Polybutadiene oil, Evonic Degussa GmbH
*19 3,6,9-trioxaundecamethylene bis(2-ethylhexanoate), The HallStar Company
*20 1,2-cyclohexane dicarboxylic acid diisononyl ester, BASF Japan Ltd.
*21 α-hydroxyalkylphenone, BASF Japan Ltd.

TABLE 2

| Evaluation item | UV irradiation mJ/cm$^2$ | Example | | | | | | Comparative Example | | | |
|---|---|---|---|---|---|---|---|---|---|---|---|
|  |  | 1 | 2 | 3 | 4 | 5 | 6 | 1 | 2 | 3 | 4 |
| Degree of curing | 1200 | 32 | 34 | 48 | 43 | 33 | 35 | 41 | 55 | 33 | 42 |
|  | 1600 | 46 | 50 | 59 | 55 | 46 | 47 | 50 | 67 | 45 | 55 |
|  | 2000 | 60 | 62 | 67 | 62 | 58 | 61 | 64 | 79 | 59 | 66 |
|  | 2400 | 71 | 72 | 78 | 77 | 70 | 71 | 78 | 87 | 71 | 75 |
|  | 2800 | 77 | 80 | 89 | 84 | 76 | 74 | 82 | 92 | 78 | 83 |
|  | 3200 | 82 | 84 | 90 | 89 | 80 | 79 | 88 | 95 | 82 | 89 |
|  | 3600 | 87 | 90 | 95 | 94 | 87 | 83 | 92 | 96 | 88 | 94 |
| Shape retainability | 1200 | B | B | A | A | B | B | B | B | B | A |
|  | 1600 | A | B | A | A | A | A | B | A | A | A |
|  | 2000 | A | A | A | A | A | A | A | A | A | A |
|  | 2400 | A | A | A | A | A | A | A | A | A | A |
|  | 2800 | A | A | A | A | A | A | A | A | A | A |
|  | 3200 | A | A | A | A | A | A | A | A | A | A |
|  | 3600 | A | A | A | A | A | A | A | A | A | A |
| Adhesion | 1200 | — | — | A | A | — | — | — | — | — | A |
|  | 1600 | A | — | A | A | A | A | — | B | A | A |
|  | 2000 | A | A | A | A | A | A | A | B | A | A |
|  | 2400 | A | A | B | A | A | A | A | B | A | B |
|  | 2800 | A | A | B | B | A | A | A | B | A | B |
|  | 3200 | B | B | B | B | B | B | B | B | A | B |
|  | 3600 | B | B | B | B | B | B | B | B | A | B |
| Adhesion retainability | 1200 | — | — | A | A | — | — | — | — | B | B |
|  | 1600 | A | — | A | A | A | A | — | — | B | B |
|  | 2000 | A | A | A | A | A | A | B | — | B | B |
|  | 2400 | A | A | — | A | A | A | B | — | B | — |
|  | 2800 | A | A | — | — | A | A | B | — | B | — |
|  | 3200 | — | — | — | — | — | — | — | — | B | — |
|  | 3600 | — | — | — | — | — | — | — | — | B | — |

As can be seen from TABLEs 1 and 2, the results of evaluation of the shape retainability, adhesion, and adhesion retainability of the photocurable resin composition of Example 1 were good when it was pre-cured by UV irradiation at 1,600 to 2,800 mJ/cm$^2$. The results of evaluation of the shape retainability, adhesion, and adhesion retainability of the photocurable resin composition of Example 2 were good when it was pre-cured by UV irradiation at 2,000 to 2,800 mJ/cm$^2$. The results of evaluation of the shape retainability, adhesion, and adhesion retainability of the photocurable resin composition of Example 3 were good when it was pre-cured by UV irradiation at 1,200 to 2,000 mJ/cm$^2$. The results of evaluation of the shape retainability, adhesion, and adhesion retainability of the photocurable resin composition of Example 4 were good when it was pre-cured by UV irradiation at 1,200 to 2,400 mJ/cm$^2$. The results of evaluation of the shape retainability, adhesion, and adhesion retainability of the photocurable resin compositions of Examples 5 and 6 were good when they were pre-cured by UV irradiation at 1,600 to 2,800 mJ/cm$^2$.

The degree of curing of the pre-cured resin layer in each of Examples 1 to 6 was in the range of 30 to 80%.

However, the results of evaluation of the adhesion retainability of the photocurable resin compositions of Comparative Examples 1, 3, and 4 were poor. In the photocurable resin composition of Comparative Example 2, the results of evaluation of adhesion were poor.

Example 7

Liquid crystal display devices and bonded glass structures for adhesion state evaluation were produced as in Example 1 except that, in the step (A) (application step) in Example 1, the photocurable resin composition film was formed so as to cover about 70% of the width of the light-shielding layer. Then the shape retainability, adhesion, and adhesion state of the pre-cured resin layers and the adhesion retainability of the light-transmitting cured resin layers were evaluated. Even when the photocurable resin composition film was formed so as to cover only 70% of the width of the light-shielding layer, the results obtained were good, as in Example 1. This may be because the pre-cured resin layer spreads so as to cover the entire light-shielding layer in the step (C) (lamination step).

Example 8

Liquid crystal display devices and bonded glass structures for adhesion state evaluation were produced as in Example 1 except that, in the step (A) (application step) in Example 1, the photocurable resin composition film was formed to a thickness of about 1.2 times the thickness of the light-shielding layer. Then the shape retainability, adhesion, and adhesion state of the pre-cured resin layers and the adhesion retainability of the light-transmitting cured resin layers were evaluated. The results obtained were good, as in Example 1.

Example 9

Figure 4A:
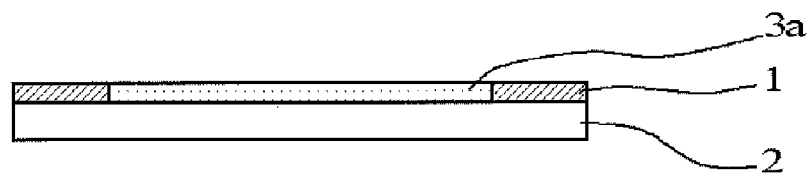
FIG. 4A is an explanatory view of a mode of application of a photocurable resin composition to a light-transmitting cover member in Example 4.
Figure 4B:
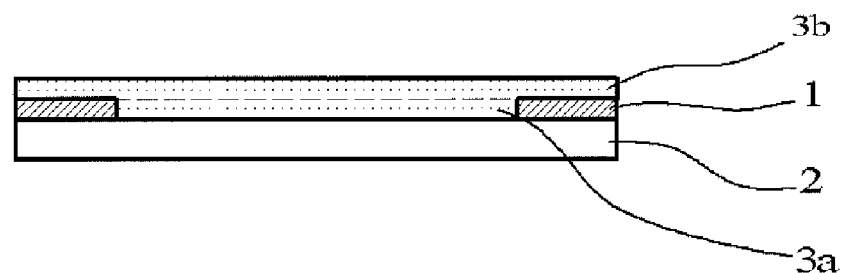
FIG. 4B is an explanatory view of the mode of application of the photocurable resin composition to the light-transmitting cover member in Example 4.

Liquid crystal display devices and bonded glass structures for adhesion state evaluation were produced as in Example 1 except that, in the step (A) (application step) in Example 1, after a photocurable resin composition 3a was applied to the same thickness as that of the light-shielding layer 1 without covering the light-shielding layer 1 as shown in FIG. 4A, a photocurable resin composition 3b was applied so as to cover the light-shielding layer 1 as shown in FIG. 4E. Then the shape retainability, adhesion, and adhesion state of the pre-cured resin layers and the adhesion retainability of the light-transmitting cured resin layers were evaluated. The results obtained were good, as in Example 1.

Comparative Example 5

Figure 5:
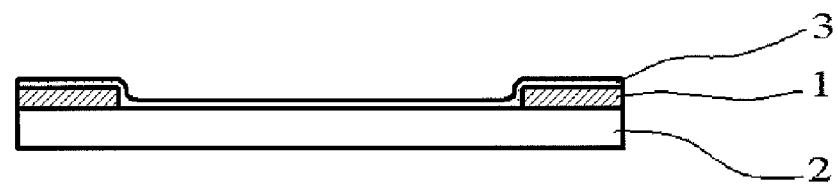
FIG. 5 is an explanatory view of a mode of application of a photocurable resin composition to a light-transmitting cover member in Comparative Example 1.

Liquid crystal display devices and bonded glass structures for adhesion state evaluation were produced as in Example 1 except that, in the step (A) (application step) in Example 1, although the photocurable resin composition 3 was formed over the entire light-shielding layer 1, as shown in FIG. 5, the thickness of the photocurable resin composition 3 formed was about 30 μm, which was smaller than the thickness of the light-shielding layer 1. Then, the shape retainability, adhesion, and adhesion state of the pre-cured resin layers and the adhesion retainability of the light-transmitting cured resin layers were evaluated. The results showed that no air bubbles were found in the products of the step (A). However, air bubbles were found in the products of the step (C) and the products of the step (D) (liquid crystal display devices), so that the adhesion was poor. However, the adhesion state was good.

Comparative Example 6

Figure 6:
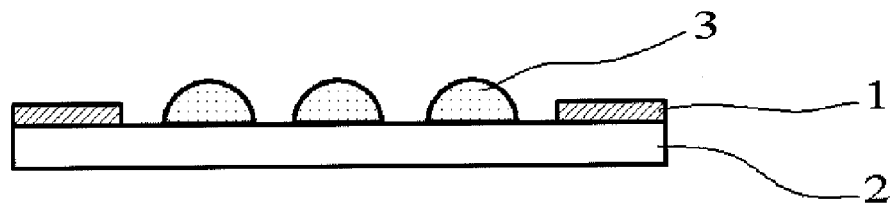
FIG. 6 is an explanatory view of a mode of application of a photocurable resin composition to a light-transmitting cover member in Comparative Example 2.

Liquid crystal display devices and bonded glass structures for adhesion state evaluation were produced as in Example 1 except that, in the step (A) (application step) in Example 1, the photocurable resin composition 3 was applied in a dot form such that the dots had a height larger than the height of the light-shielding layer 1 but did not cover the light-shielding layer 1, as shown in FIG. 6. Then, the shape retainability, adhesion, and adhesion state of the pre-cured resin layers and the adhesion retainability of the light-transmitting cured resin layers were evaluated. Since it was clear that air bubbles were included after irradiation with ultraviolet rays, the product was laminated to the liquid crystal display device without irradiation with ultraviolet rays. Then air bubbles were observed not only around the light-shielding layer but also over the entire region, so that the adhesion was poor. However, the adhesion state was good.

Comparative Example 7

Figure 7:
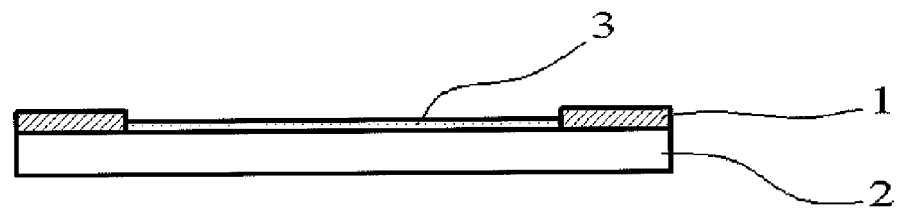
FIG. 7 is an explanatory view of a mode of application of a photocurable resin composition to a light-transmitting cover member in Comparative Example 3.

Liquid crystal display devices and bonded glass structures for adhesion state evaluation were produced as in Example 1 except that, in the step (A)(application step) in Example 1, the photocurable resin composition 3 was applied so as not to cover the light-shielding layer 1 such that the thickness of the applied photocurable resin composition 3 was smaller than the thickness of the light-shielding layer 1, as shown in FIG. 7. Then, the shape retainability, adhesion, and adhesion state of the pre-cured resin layers and the adhesion retainability of the light-transmitting cured resin layers were evaluated. The results showed that no air bubbles were found in the products of the step (A). However, air bubbles were observed in the products of the lamination step, i.e., the step C, and also observed in the products of the step (D) (complete-curing step) (liquid crystal display devices), and the adhesion was poor. However, the adhesion state was good.

Example 10

A method of manufacturing an image display device in which the image display member is a touch panel (display element/cured resin layer/touch pad) will next be described with reference to the drawings.

Figure 8A:
FIG. 8A is an explanatory view of a method of manufacturing an image display device that uses a touch panel as an image display member, the method being described in Example 10.
Figure 8B:
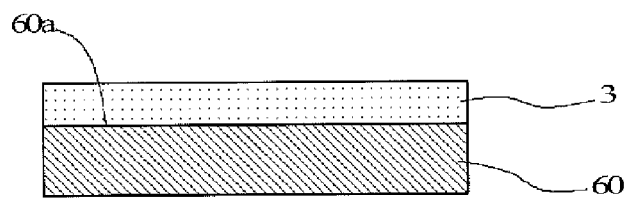
FIG. 8B is an explanatory view of the method of manufacturing the image display device that uses the touch panel as the image display member, the method being described in Example 10.

First, a display element 60 such as a liquid crystal display element shown in FIG. 8A is prepared, and a photocurable resin composition 3 in a liquid form is applied to a surface 60a of the display element 60, as shown in FIG. 8B.

Figure 8C:
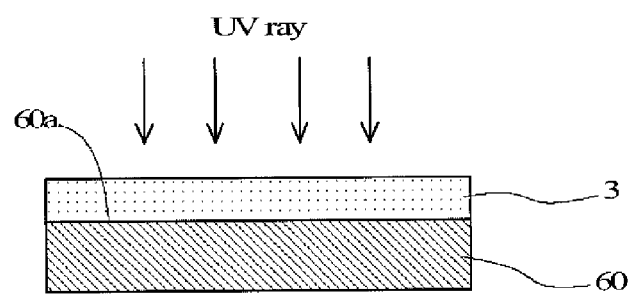
FIG. 8C is an explanatory view of the method of manufacturing the image display device that uses the touch panel as the image display member, the method being described in Example 10.
Figure 8D:
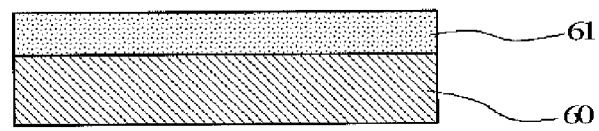
FIG. 8D is an explanatory view of the method of manufacturing the image display device that uses the touch panel as the image display member, the method being described in Example 10.
Figure 8E:
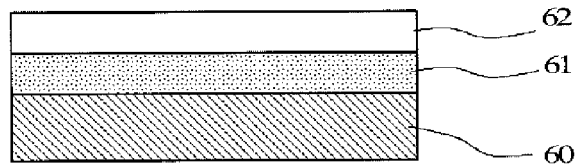
FIG. 8E is an explanatory view of the method of manufacturing the image display device that uses the touch panel as the image display member, the method being described in Example 10.
Figure 8F:
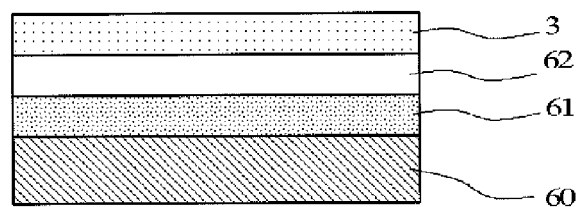
FIG. 8F is an explanatory view of the method of manufacturing the image display device that uses the touch panel as the image display member, the method being described in Example 10.
Figure 8G:
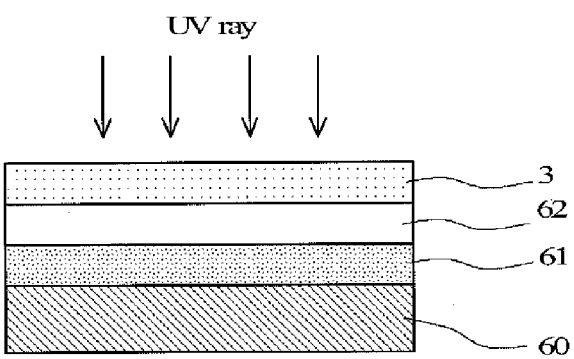
FIG. 8G is an explanatory view of the method of manufacturing the image display device that uses the touch panel as the image display member, the method being described in Example 10.
Figure 8H:
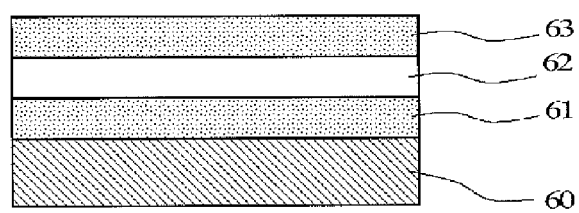
FIG. 8H is an explanatory view of the method of manufacturing the image display device that uses the touch panel as the image display member, the method being described in Example 10.
Figure 8I:
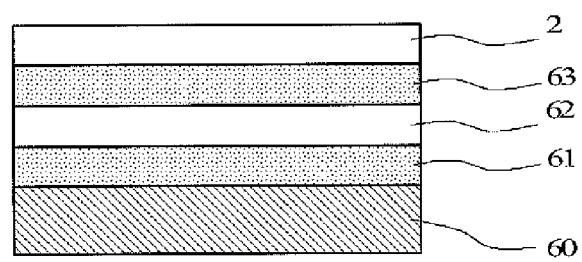
FIG. 8I is an explanatory view of the method of manufacturing the image display device that uses the touch panel as the image display member, the method being described in Example 10.

Next, as shown in FIG. 8C, the applied photocurable resin composition 3 is pre-cured by irradiation with ultraviolet rays to form a pre-cured resin layer 61 (FIG. 8D). Next, as shown in FIG. 8E, a touch pad 62 is laminated to the pre-cured resin layer 61. Then, as shown in FIG. 8F, the photocurable resin composition 3 in a liquid form is again applied to the touch pad 62. As shown in FIG. 5G, the applied photocurable resin composition 3 is pre-cured by irradiation with ultraviolet rays to thereby form a pre-cured resin layer 63 (FIG. 8H). Next, as shown in FIG. 8I, a light-transmitting cover member 2 is laminated thereto.

Finally, as shown in FIG. 8J, the pre-cured resin layers 61 and 63 are irradiated with ultraviolet rays through the light-transmitting cover member 2 to completely cure the pre-cured resin layers 61 and 63. In this manner, an image display device 100 having a configuration including touch panel (=display element/cured resin layer/touch pad)/cured resin layer/light-transmitting cover member can be obtained (FIG. 8K).

In this Example, the pre-cured resin layers 61 and 63 are completely cured simultaneously, but they may be completely cured separately.

Figure 8K:
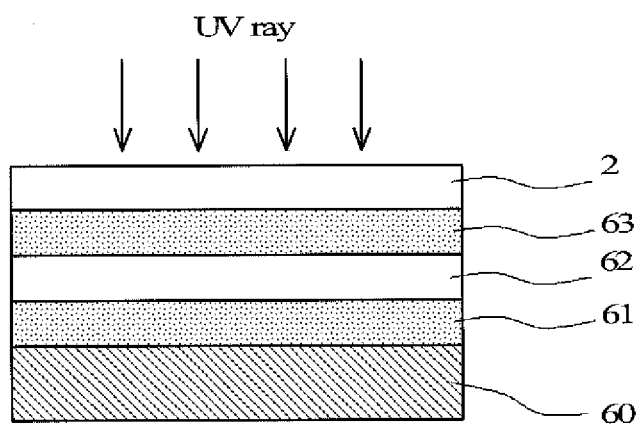
FIG. 8K is an explanatory view of the method of manufacturing the image display device that uses the touch panel as the image display member, the method being described in Example 10.
Figure 8K:
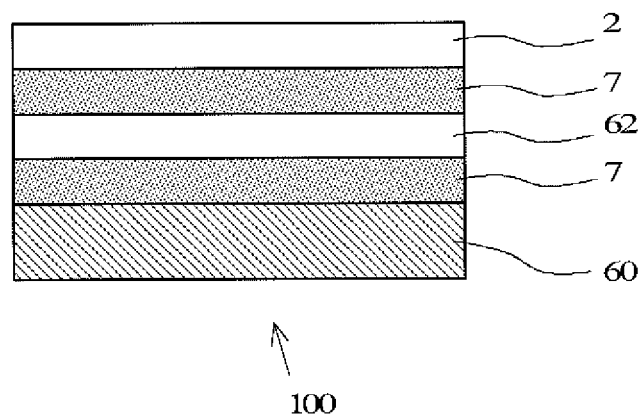

The image display device having the configuration shown in FIG. 8K can also be produced by the following methods, but the production method is not limited thereto.

(a) The photocurable resin composition is applied to the light-transmitting cover member and pre-cured by irradiation with ultraviolet rays to form a pre-cured resin layer. The touch pad is applied thereto. The photocurable resin composition is applied to the touch pad and pre-cured by irradiation with ultraviolet rays to form a pre-cured resin layer. The image display member is laminated to this pre-cured resin layer, and the two pre-cured resin layers are completely cured simultaneously by irradiation with ultraviolet rays through the light-transmitting cover member to form respective cured resin layers. In this manner, the image display device as shown in FIG. 8K is obtained.

(b) The photocurable resin composition is applied to the light-transmitting cover member and pre-cured by irradiation with ultraviolet rays to form a pre-cured resin layer, and the touch pad is laminated thereto. Separately, the photocurable resin composition is applied to the image display member and pre-cured by irradiation with ultraviolet rays to form a pre-cured resin layer. The light-transmitting cover member is laminated to the pre-cured resin layer on the image display member through the touch pad. Then the two pre-cured resin layers are completely cured simultaneously by irradiation with ultraviolet rays through the light-transmitting cover member to form cured resin layers. In this manner, the image display device as shown in FIG. 8K is obtained.

(c) The photocurable resin composition is applied to the image display member and pre-cured by irradiation with ultraviolet rays to form a pre-cured resin layer. The touch pad is laminated thereto, and the pre-cured resin layer is completely cured to form a light-transmitting cured resin layer. The photocurable resin composition is applied to the touch pad and pre-cured by irradiation with ultraviolet rays to form a pre-cured resin layer. The light-transmitting cover member is laminated thereto, and the pre-cured resin layer is completely cured by irradiation with ultraviolet rays to form a light-transmitting cured resin layer. In this manner, the image display device as shown in FIG. 8K is obtained.

(d) The photocurable resin composition is applied to the light-transmitting cover member and pre-cured by irradiation with ultraviolet rays to form a pre-cured resin layer. The touch pad is laminated thereto, and the pre-cured resin layer is completely cured to form a light-transmitting cured resin layer. The photocurable resin composition is applied to the touch pad and pre-cured by irradiation with ultraviolet rays to form a pre-cured resin layer. The image display member is laminated thereto, and the pre-cured resin layer is completely cured by irradiation with ultraviolet rays to form a light-transmitting cured resin layer. In this manner, the image display device as shown in FIG. 8K is obtained.

(e) The photocurable resin composition is applied to the image display member and pre-cured by irradiation with ultraviolet rays to form a pre-cured resin layer. The touch pad is laminated thereto, and the pre-cured resin layer is completely cured to form a light-transmitting cured resin layer. The photocurable resin composition is applied to the light-transmitting cover member and pre-cured by irradiation with ultraviolet rays to form a pre-cured resin layer. The light-transmitting cover member is laminated through the pre-cured resin layer, and the pre-cured resin layer is completely cured by irradiation with ultraviolet rays to form a light-transmitting cured resin layer. In this manner, the image display device as shown in FIG. 8K is obtained.

(f) The photocurable resin composition is applied to the image display member and pre-cured by irradiation with ultraviolet rays to form a pre-cured resin layer. The touch pad is laminated thereto, and the pre-cured resin layer is completely cured to form a light-transmitting cured resin layer. The photocurable resin composition is applied to the light-transmitting cover member and pre-cured by irradiation with ultraviolet rays to form a pre-cured resin layer. The light-transmitting cover member is laminated to the touch pad through the pre-cured resin layer, and the pre-cured resin layer is completely cured by irradiation with ultraviolet rays to form a light-transmitting cured resin layer. In this manner, the image display device as shown in FIG. 8K is obtained.

INDUSTRIAL APPLICABILITY

In the photocurable resin composition of the present invention, an acrylate oligomer, an acrylate monomer, a plasticizer, and a photopolymerization initiator are selected as four specific components, and the amounts added of the acrylate oligomer, acrylate monomer, and plasticizer are specified. In addition, a specific solid tackifier and a specific liquid plasticizing component are used to form the plasticizer, and the mass ratio of the solid tackifier to the liquid plasticizing component is adjusted within a specific range. Therefore, the shape retainability, adhesion, and adhesion retainability of a cured resin layer when lamination is performed after photocuring can be improved, and the shape retainability, adhesion, and adhesion retainability of a pre-cured resin layer and its adhesion retainability after curing can be improved. Accordingly, the photocurable resin composition can be preferably used to manufacture an image display device by a photopolymerization process, particularly two photopolymerization processes, i.e., pre-curing and complete-curing processes, without using a thermal polymerization process.

REFERENCE SIGNS LIST

1 light-shielding layer
2 light-transmitting cover member
2a light-shielding layer-formed surface of light-transmitting cover member
3, 3a, 3b photocurable resin composition
4 step
5, 61, 63 pre-cured resin layer
6 image display member
7 light-transmitting cured resin layer
10, 100 image display device
30 glass base
31 glass plate
60 display element
62 touch pad

The invention claimed is:
1. A method of manufacturing an image display device including an image display member and a light-transmitting cover member that are stacked through a light-transmitting cured resin layer formed from a photocurable resin composition in a liquid form, the method comprising the following steps (A) to (C):
<Step (A)>
  a step of applying the photocurable resin composition in a liquid form to a surface of the light-transmitting cover member or a surface of the image display member;
<Step (B)>
  a step of irradiating the applied photocurable resin composition with ultraviolet rays to form a cured resin layer having a degree of curing 90% or higher; and
<Step (C)>
  a step of laminating the light-transmitting cover member to the image display member such that the cured resin layer is disposed inward to thereby obtain the image display device, wherein
the photocurable resin composition contains the following components (a) to (d):
<component (a)>an acrylate-based oligomer component selected from the group consisting of a polyisoprene- based (meth)acrylate oligomer, a polybutadiene-based (meth)acrylate oligomer, and a polyurethane-based (meth)acrylate oligomer;

<component (b)>an acrylic-based monomer component;

<component (c)>a plasticizer component; and

<component (d)>a photoradical polymerization initiator component; wherein a total amount of the component (a) and the component (b) contained in the photocurable resin composition is 25 to 80% by mass, an amount of the component (c) contained in the photocurable resin composition is 30 to 60% by mass, the component (c) contains a solid tackifier having a softening point of 60 to 150° C. and a liquid plasticizing component as well as contains a tackifier and a liquid plasticizing component, and a mass ratio of the tackifier to the liquid plasticizing component is in a range of 60 to 30:30 to 10.

2. The manufacturing method according to claim 1, wherein the liquid plasticizing component is at least one selected from the group consisting of a polybutadiene-based plasticizer, a polyisoprene-based plasticizer, a phthalate-based plasticizer, and an adipate-based plasticizer.

3. The manufacturing method according to claim 2, wherein the image display device is configured such that the light-transmitting cover member having a light-shielding layer formed on a peripheral edge portion thereof is stacked through a light-transmitting cured resin layer formed from the photocurable resin composition in a liquid form such that a light-shielding layer-formed surface of the light-transmitting cover member is disposed facing the image display member.

4. The manufacturing method according to claim 1, wherein the image display device is configured such that the light-transmitting cover member having a light-shielding layer formed on a peripheral edge portion thereof is stacked through a light-transmitting cured resin layer formed from the photocurable resin composition in a liquid form such that a light-shielding layer-formed surface of the light-transmitting cover member is disposed facing the image display member.

5. A method of manufacturing an image display device including an image display member and a light-transmitting cover member that are stacked through a light-transmitting cured resin layer formed from a photocurable resin composition in a liquid form, the method comprising the following steps (A) to (D):

<Step (A)> a step of applying the photocurable resin composition in a liquid form to a surface of the light-transmitting cover member or a surface of the image display member;

<Step (B)> a step of irradiating the applied photocurable resin composition with ultraviolet rays to pre-cure the applied photocurable resin composition, whereby a pre-cured resin layer is formed;

<Step (C)> a step of laminating the light-transmitting cover member to the image display member such that the pre-cured resin layer is disposed inward; and <Step (D)> a step of irradiating the pre-cured resin layer held between the image display member and the light-transmitting cover member with ultraviolet rays to completely cure the pre-cured resin layer, whereby the image display device is obtained in which the image display member and the light-transmitting cover member are stacked through the light-transmitting cured resin layer; wherein the photocurable resin composition contains the following components (a) to (d):

<component (a)>an acrylate-based oligomer component selected from the group consisting of a polyisoprene-based (meth)acrylate oligomer, a polybutadiene-based (meth)acrylate oligomer, and a polyurethane-based (meth)acrylate oligomer;

<component (b)>an acrylic-based monomer component;

<component (c)>a plasticizer component; and

<component (d)>a photoradieal polymerization initiator component; wherein a total amount of the component (a) and the component (b) contained in the photocurable resin composition is 25 to 80% by mass, an amount of the component (c) contained in the photocurable resin composition is 30 to 60% by mass, the component (c) contains a solid tackifier having a softening point of 60 to 150° C. and a liquid plasticizing component, and a mass ratio of the tackifier to the liquid plasticizing component is in a range of 60 to 30:30 to 10.

6. The manufacturing method according to claim 5, wherein the liquid plasticizing component is at least one selected from the group consisting of a polybutadiene-based plasticizer, a polyisoprene-based plasticizer, a phthalate-based plasticizer, and an adipate-based plasticizer.

7. The manufacturing method according to claim 6, wherein the image display device is configured such that the image display member and the light-transmitting cover member having a light-shielding layer formed on a peripheral edge portion thereof are stacked through a light-transmitting cured resin layer formed from the photocurable resin composition in a liquid form such that a light-shielding layer-formed surface of the light-transmitting cover member is disposed facing the image display member.

8. The manufacturing method according to claim 5, wherein the image display device is configured such that the image display member and the light-transmitting cover member having a light-shielding layer formed on a peripheral edge portion thereof are stacked through a light-transmitting cured resin layer formed from the photocurable resin composition in a liquid form such that a light-shielding layer-formed surface of the light-transmitting cover member is disposed facing the image display member.

* * * * *